July 2, 1963 J. J. MURAY 3,096,437
MEANS FOR PULSING AN ION BEAM
Filed March 27, 1961 2 Sheets-Sheet 1
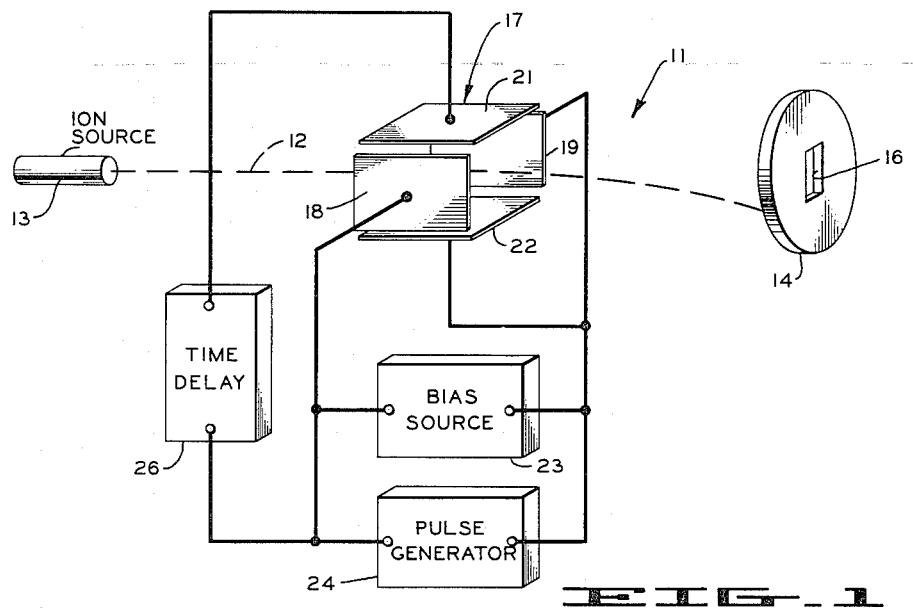
FIG_1
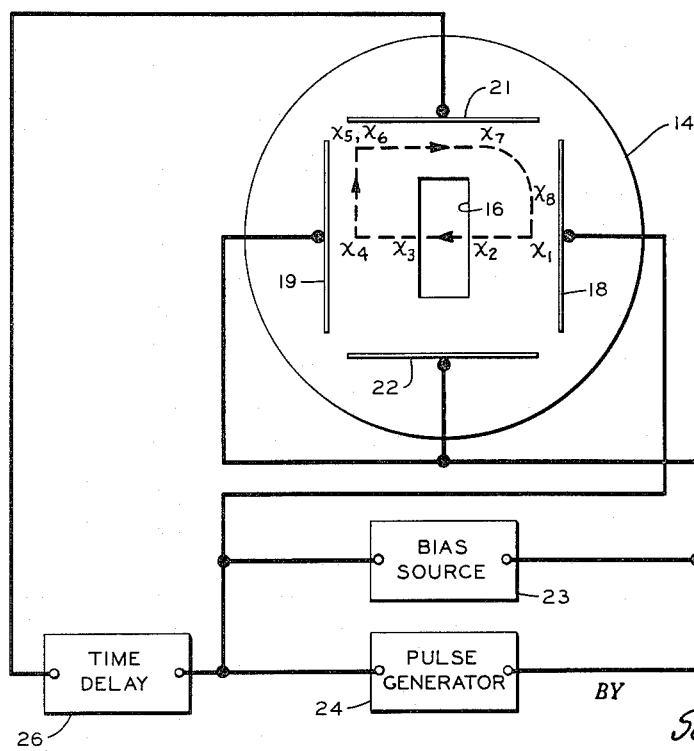
FIG_2
INVENTOR.
JULIUS J. MURAY
BY
Schapp & Hatch
ATTORNEYS

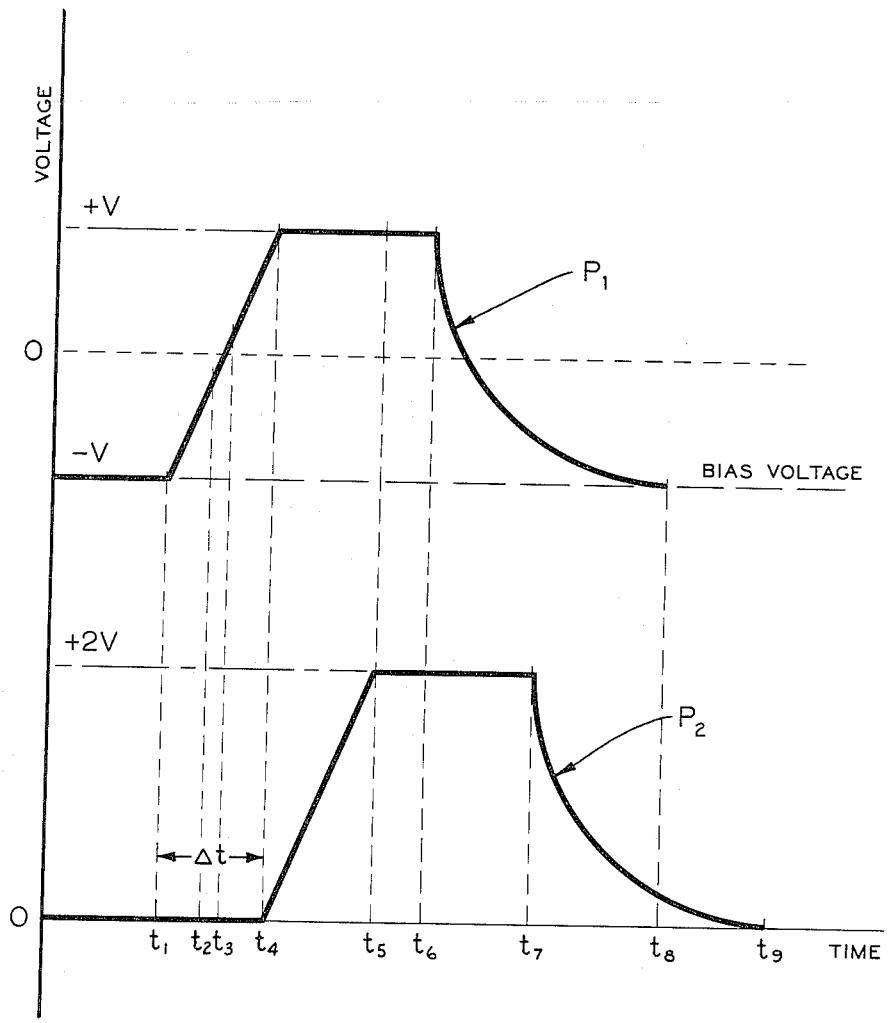
FIG_3
INVENTOR.
JULIUS J. MURAY 3,096,437
MEANS FOR PULSING AN ION BEAM
Julius J. Muray, Los Altos, Calif., assignor, by mesne assignments, to High Voltage Engineering Corporation, Burlington, Mass., a corporation of Massachusetts
Filed Mar. 27, 1961, Ser. No. 98,565
3 Claims. (Cl. 250—41.9)

This invention relates to the production of pulsed beams of ionized particles, and is particularly directed to means for pulsing an ion beam to produce extremely short beam pulses over a wide range of frequencies.

In the production of pulse beams of ionized particles, the ion source is typically turned on and off or the beam is swept across a narrow slit in a collector plate by means of alternating magnetic or electrostatic fields. The rapidity with which an ion source can be switched on and off is of course limiting upon the shortness of the beam pulses that can be produced by employment of the former method. In the production of beam pulses by the latter method, the shortness of pulse that can be obtained is also limited. More specifically, pulses produced by sweeping are limited in length by the slit width, sweep frequency, width of total scan, and particularly by the sweep speed as determined by the wave shape of the voltage or current employed in the generation of the sweep deflection field.

In the conventional employment of alternating sweep deflection fields very short pulses cannot in general be produced except at very high repetition rates. This is due to the sinusoidal configuration of the alternating deflection field, such a field configuration having a relatively gradual rise and fall with respect to time and being therefore productive of relatively slow sweep speeds except at extremely high frequencies.

The present invention overcomes the foregoing limitations and has for one of its objects the provision of means for producing very short ionized particle beam pulses over a wide range of frequencies.

It is a specific object of the invention to provide ion beam pulses having durations of the order of several millimicroseconds and at frequencies which may vary from a few per second to several megacycles.

Another object of the invention is the provision of a swept beam pulsing system productive of beam pulses which have a substantially constant particle density over the entire beam cross section.

It is a further object of the invention to provide beam pulsing means of the class described which employs rectangular wave deflection voltage pulses in the generation of the sweep deflection field.

A still further object of the invention is the provision of a swept slit beam pulsing system wherein the beam is swept across the slit and a pulse is transmitted during a portion of the fast use time leading edge of a rectangular (actually trapezoidal) sweep deflection pulse, while transmission of an undesirable secondary pulse resulting from the return sweep of the beam across the slit during the relatively slow decay period of the pulse is avoided.

Further objects and advantages of my invention will be apparent as the specification progresses, and the new and useful features of my method for producing short pulses in ion beams will be fully defined in the claims attached hereto.

The preferred form of my invention is illustrated in the accompanying drawings forming part of this application, in which:

FIGURE 1 is a perspective view, with electrical components shown schematically of an ionized particle beam pulsing means constructed in accordance with the present invention;

FIGURE 2, an end view in the direction of beam traverse of the deflection plates and slit of the pulsing means, electrical components being shown schematically; and FIGURE 3, a graphical illustration of the deflection voltage pulses with respect to time that are employed in the pulsing means to sweep the beam.

While I have shown only the preferred form of my invention, it should be understood that various changes or modifications may be made within the scope of the claims attached hereto without departing from the spirit of the invention.

Considering now the invention in some detail and referring to the illustrated form thereof in the drawing, means 11 is provided for pulsing a continuous ionized particle beam, as indicated at 12, which emanates from a conventional ion source 13. The resulting beam pulses may be introduced to a high energy particle accelerator or other pulsed beam utilizing device. It is particularly important to note that the pulsing means 11 is arranged to produce extremely short beam pulses over a wide range of frequencies, with the pulses being of substantially uniform particle density over the entire beam cross section.

The pulsing means 11 includes a collector 14 provided with a slit aperture 16 positioned in spaced alignment with the ion source 13 so that the axis of traverse of the particle beam 12 right angularly intersects the longitudinal median axis of the slit, preferably at its center. The collector 14 may be disposed, for example, at the input end of a particle accelerator with the slit serving as the beam injection aperture thereof. With such arrangement the beam would normally pass uninterruptedly through the slit into the accelerator or other ion utilizing equipment. However, the pulsing means 11 here includes sweep means 17 for deflecting the beam off axis and periodically sweeping the beam across the slit. The beam is accordingly normally collected upon the collector 14 and passes through the slit only during the transit time of the beam thereacross. Consequently a series of beam pulses emanates from the slit as the beam is periodically swept across the slit.

It will be appreciated that, in order for the beam pulses emanating from the slit to be of short duration, the slit must be narrow and the beam transit time across the slit very short. A very rapid sweeping of the beam across the slit is thus indicated. Moreover, in order for the beam pulses to be of uniform particle density over the entire beam cross section, a constant sweep velocity during slit transit is required. To these ends the sweep means 17 is arranged to generate either a magnetic or electrostatic bias field that normally deflects the beam off axis to a position of collection upon the collector 14.

In addition, the sweep means periodically generates a pulsed deflection field, which again may be either magnetic or electrostatic, in opposition to the bias fields and of sufficient strength to deflect the beam from its normal biased position on one side of the slit, across the slit to the opposite side thereof.

The field pulses, as well as the voltage or current pulses producing same, have a configuration that is normally termed as "rectangular" although the pulses of this form that can be practically produced are actually trapezoidal. The pulses have a substantially linear, sharply sloped leading edge (viz. short use time), a flat crest, and an exponentially declining trailing edge (viz., long decay time) compared to the use time as indicated by the wave forms of FIG. 3.

The linear, sharply sloped leading edge effects rapid sweeping of the beam across the slit at constant velocity to thus produce a very short beam pulse having uniform particle density. However, the relatively long, exponentially declining trailing edge of each pulse would normally produce a return sweep of the beam across the slit at a relatively slow and non-uniform rate, thus resulting in the generation of an undesirable pulse.

To prevent this unwanted pulse, and as a particularly salient feature of the invention, the sweep means 17 is arranged to generate a second pulsed field in delayed relationship to the first and oriented 90° thereto. The delay between pulses of the first and second pulsed fields is preferably equal to the rise time of the pulses of the first, but may be greater than the rise time by an amount that is less than the pulse length (viz., time between the termination of the rise time and start of the decay period).

The delayed pulses of the second field thus sweep the beam parallel to the slit subsequent to the time the beam has crossed the slit from its normal biased position. Moreover, the magnitude of the pulses of the second pulsed field is sufficient to deflect the beam beyond the end of the slit such that the return sweep of the beam, produced by the trailing edge of each pulse of the first field, occurs some distance beyond the end of the slit and the beam does not pass through the slit during the return sweep.

The effect of the two pulsed fields generated by the sweep means thus combine to sweep the beam along a closed path that includes a linear portion extending across the slit from the normal biased position of the beam and a return path portion extending from the end of the linear portion around the end of the slit and back to the normal biased position.

The foregoing will be better understood upon consideration of the specific embodiment of the sweep means 17 illustrated in the drawings wherein the components are arranged to generate deflection fields of an electrostatic nature. Considering the slit 16 to be vertically oriented, the sweep means comprises a pair of opposed horizontal deflection plates 18, 19 equally spaced on horizontally opposite sides of the beam axis intermediate the ion source 13 and collector 14. In addition, a pair of opposed vertical deflection plates 21, 22 are provided oriented 90° to the horizontal plates and equally spaced on vertically opposite sides of the beam axis.

A bias source 23, such as a D.C. voltage supply, is connected between the horizontal plates 18, 19 as is a pulse generator 24 for generating rectangular (actually trapezoidal) voltage pulses of opposite polarity to the bias voltage. The sweep means also includes means for applying voltage pulses to the vertical deflection plates 21, 22, and such means is preferably provided as a time delay line 26 connected between pulse generator 24 and one plate 21, the other plate 22 being connected to one horizontal deflection plate 19. Alternatively, a separate pulse generator could, of course, be provided to apply deflection voltage to the vertical plates.

As indicated in FIGURE 3, the bias source 23 applies a constant bias voltage, $-v$, to the horizontal deflection plates 18, 19 so as to establish a bias deflection field therebetween. The bias field deflects the beam off-axis to a normal biased position intercepted by the collector 14 and indicated at, $x_1$, in FIG. 2. At time, $t_1$, the pulse generator 24 applies a pulse, $P_1$, to the horizontal deflection plates in opposition to the bias voltage, $-v$, such pulse having a peak magnitude of for example, $+2v$. The pulse is of a trapezoidal (so-called rectangular) configuration with a substantially linear, sharply sloped leading edge having a very short rise time, $\Delta t$. This pulse produces a resultant horizontal deflection field that varies linearly during the rise time from the bias value, $-v$, to a value, $+v$, at time, $t_4$. The beam is hence deflected at a constant rate from its bias position, $x_1$, horizontally across the collector to a position $x_4$, on the opposite side of the slit.

Between times $t_2$ and $t_3$, corresponding to field voltages slightly less than and slightly greater than zero, the beam crosses the slit 16 from a position $x_2$, at one edge to a position, $x_3$, at the other edge thereof. During the slit transit time, $t_2$–$t_3$, the beam passes through the slit to produce a beam pulse of corresponding short duration.

Between times $t_4$ and $t_6$, which corresponds to the pulse length or flat crest portion of the pulse, $P_1$, the horizontal deflection voltage is constant at the value, $+v$. Hence the horizontal position of the beam would normally be maintained at position, $x_4$, during this interval. However, the time delay line 26 is arranged to produce a time delay equal to the rise time, $\Delta t$, and consequently at time, $t_4$, a delayed pulse, $P_2$, originating from the pulse generator 24 is applied to the vertical deflection plates.

The delayed pulse establishes a vertical deflection field between the plates 21, 22 having a magnitude of $2v$, disregarding attenuation in the delay line. Hence, during the use time of the pulse, $P_2$, the beam is swept vertically upward and parallel to the slit to a position, $x_5$, located above the end of the slit. This positioning of the beam occurs at time, $t_5$, corresponding to the end of the rise time of the pulse, $P_2$.

The beam remains at position, $x_5$, until time, $t_6$, corresponding to the start of the decay period of pulse, $P_1$. The beam now is swept horizontally across the collector above the end of the slit, the vertical position of the beam being held until the start of the decay period of pulse, $P_2$, at time, $t_7$. At such time, $t_7$, the beam is positioned at, $x_7$, on the same side of the slit as that from which the scanning movement originated.

From position, $x_7$, the beam describes a downwardly curved path to a position $x_8$ corresponding to termination of pulse, $P_1$, at time, $t_8$. The beam then passes vertically downward to its normal bias position, $x$, in the interval, $t_8$–$t_9$, between the terminations of pulses $P_1$ and $P_2$. Thus the beam is swept across the slit 16 only during the desirable linear fast use time leading edge of the horizontal deflection pulse and is bypassed around the end of the slit, without crossing same, and is returned to its normal bias position during the undesirable decay period of the pulse.

It will be appreciated that the very short duration beam pulses produced by the pulsing means of the present invention can be generated over a wide range of frequencies, the beam pulse frequency corresponding to the frequency of the pulse generator 24 which may be readily adjusted from very low to very high frequencies without regard to rise time.

As a specific example of the beam pulsing system, beam pulses having durations of the order of $10 \times 10^{-9}$ sec. may be produced at frequencies ranging from several cycles to several mc. by employment of components having the following typical characteristics.

Pulse generator:
　Type—square wave
　Pulse use time—$0.1 \mu$sec.
　Pulse length—$3 \times 10^{-7}$ sec.
　Pulse peak voltage—2 kv.
　Pulse frequency—several c.p.s. to several mc.
Bias source:
　Type—D.C. voltage supply
　Output voltage—2 kv.

What is claimed is:

1. A system for pulsing a beam of ionized particles, comprising a collector having a slit aperture therein disposed with its center in alignment with the axis of beam traverse of an ionized particle beam, bias field means generating a continuous bias field for deflecting said beam transversely off axis relative to said slit aperture, means periodically generating a pulsed sweep deflection field in opposition to said bias field with the strength of said deflection field with respect to time having a trapezoidal waveform including a substantially linear very fast rise time leading edge and exponential trailing edge of relatively long decay period interconnected by a constant flat crest portion, and means periodically generating a second pulsed sweep deflection field oriented 90° to said first deflection field and delayed relative thereto by a time at least as long as the rise time of a pulse of the first field and shorter than the time between initiation of the leading edge and trailing edge thereof, said second pulsed field having pulses of constant peak magnitude sufficient to deflect said beam parallel to said slit aperture beyond an end thereof and prevent said beam from crossing said slit aperture during decay periods of the pulses of said first deflection field.

2. A system for pulsing a beam of ionized particles, comprising a collector having a slit aperture therein disposed with its center in alignment with the axis of beam traverse of an ionized particle beam, bias field means generating a continuous bias field for deflecting said beam transversely off axis relative to said slit aperture, a first pair of opposed deflection plates equally spaced on transversely opposite sides of the axis relative to said slit aperture at a position spaced from said collector in contra direction to beam traverse, a second pair of opposed deflection plates equally spaced on longitudinally opposite sides of the beam axis relative to said slit aperture, and voltage pulse generating means for applying trapezoidal voltage pulses having very fast linear use times to said first pair of deflection plates in opposition to said bias field and to said second pair of deflection plates after respective time delays equal to the rise times of the pulses.

3. Means for producing a pulsed ionized particle beam comprising a continuous beam ionized particle source, a collector disposed in spaced relation to said source and having a slit aperture in alignment with the axis of beam traverse therefrom, a first pair of opposed deflection plates disposed intermediate said source and collector and equally spaced on transversely opposite sides of said axis relative to said slit aperture, a second pair of opposed deflection plates oriented 90° from said first pair of plates and equally spaced on opposite sides of said axis, a continuous bias voltage source connected between said first pair of deflection plates, a fast rise time trapezoidal voltage pulse generator connected between said first pair of deflection plates in opposition to said bias voltage source, and time delay means connecting said pulse generator to said second pair of deflection plates, said time delay means having a delay time equal tot the rise time of the pulses generated by said pulse generator.

References Cited in the file of this patent
UNITED STATES PATENTS

| | | |
|---|---|---|
| 2,050,628 | Prinz | Aug. 11, 1936 |
| 2,774,882 | Wells | Dec. 18, 1956 |
| 2,908,816 | Le Poole | Oct. 13, 1959 |
| 2,956,169 | King et al. | Oct. 11, 1960 |
| 2,987,618 | Long | June 6, 1961 |